UNITED STATES PATENT OFFICE.

ROBERT E. SCHMIDT AND PAUL TUST, OF ELBERFELD, GERMANY, ASSIGNORS TO THE FARBENFABRIKEN OF ELBERFELD CO., OF NEW YORK, N. Y.

ANTHRAQUINONE DYE AND PROCESS OF MAKING SAME.

SPECIFICATION forming part of Letters Patent No. 675,574, dated June 4, 1901.

Application filed October 26, 1900. Serial No. 34,485. (No specimens.)

*To all whom it may concern:*

Be it known that we, ROBERT E. SCHMIDT, doctor of philosophy, chemist, and PAUL TUST, chemist, (assignors to the FARBENFABRIKEN OF ELBERFELD COMPANY, of New York,) residing at Elberfeld, Germany, have invented a new and useful Improvement in New Anthraquinone Dyes and Processes of Making the Same; and we hereby declare the following to be a clear and exact description of our invention.

Our new process consists in causing halogens, such as bromin, to act on alpha or beta alphylamidoanthraquinone sulfonic acids which can be obtained by the action of alphylamins—such as anilin, toluidin, or the like—on alpha or beta nitroanthraquinone sulfonic acids (see *Berichte der Deutschen Chemischen Gesellschaft*, Vol. 15, page 1514) and further heating the new halogen sulfonic acids thus obtained with primary aromatic amins, such as anilin, ortho or para toluidin, xylidin, or the like. By means of this process valuable blue dyestuff sulfonic acids are obtained. The new coloring-matters thus produced are in a dry state dark powders which are soluble with great difficulty in water and soluble in ammonia with a blue color. They dye unmordanted and mordanted wool fast-blue shades.

In carrying out our new process practically we can proceed as follows, the parts being by weight: Into a mixture prepared from ten parts of alpha-para-tolylamidoanthraquinone sulfonic acid and one hundred and fifty parts of glacial acetic acid fifteen parts of bromin are introduced at the ordinary temperature. After having been allowed to stand for some time the reaction mass is heated to boiling for a short while in order to complete the reaction. The brominated alphatolylamidoanthraquinone sulfonic acid thus prepared is in a dry state, a cinnabar-red crystalline powder which is soluble in concentrated sulfuric acid with a yellow color, which color changes into violet on the addition of boric acid. It dyes unmordanted wool fast yellowish-red shades.

In order to produce the condensation product, with paratoluidin ten parts of bromo-alpha-paratolylamidoanthraquinone sulfonic acid are mixed with one hundred parts of paratoluidin. This mixture is boiled in a vessel provided with a reflux condenser until it has assumed a clear-blue color. After the reaction mass has been allowed to cool down to about from 50° to 80° centigrade it is mixed with alcohol, by means of which operation the new compound separates. By recrystallization from pyridin it is obtained in the shape of needles having a metallic luster. When dry and pulverized, the new dyestuff thus obtained is a bluish powder having a metallic luster. It is soluble with difficulty in cold and readily soluble in hot water with a blue color, which is changed into greenish blue on the addition of ammonia or of a dilute caustic-soda lye and soluble in alcohol with a blue color. By concentrated sulfuric acid (of 66° Baumé) it is dissolved with a bluish-violet color, which turns greener on the addition of a small quantity of ice, while on adding a larger quantity of ice the color of the solution changes into bluish green and thereupon into green. It dyes unmordanted wool clear greenish-blue shades and chrome-mordanted wool blue shades.

Analogous dyestuffs can be prepared if instead of paratoluidin other aromatic bases or if instead of bromo-alpha-paratolylamidoanthraquinone sulfonic acid other of the above-mentioned alpha or beta alphylamidoanthraquinone sulfonic acids are used in the above example.

Having now described our invention and in what manner the same is to be performed, what we claim as new, and desire to secure by Letters Patent, is—

1. The process for producing new anthraquinone dyestuffs which process consists in first treating the herein-described alphylamidoanthraquinone sulfonic acids with halogens, secondly heating the halogen derivatives thus obtained with primary aromatic amins, and finally isolating the dyestuff sulfonic acids thus obtained, substantially as hereinbefore described.

2. The process for producing a new anthraquinone dyestuff by first treating the alpha-paratolylamidoanthraquinone sulfonic acid with bromin, secondly heating the bromo-alpha-paratolylamidoanthraquinone sulfonic acid thus obtained with paratoluidin and finally isolating the resulting dyestuff sulfonic acid, substantially as hereinbefore described.

3. The herein-described anthraquinone dyestuffs which, when dry and pulverized, are dark powders having a metallic luster, difficultly soluble in water and soluble in ammonia with a blue color, dyeing unmordanted and mordanted wool fast-blue shades, substantially as hereinbefore described.

4. The herein-described new anthraquinone dyestuff obtainable by heating the brominated alpha-paratolylamidoanthraquinone sulfonic acid with paratoluidin, which is, when dry and pulverized, a bluish powder having a metallic luster being soluble with difficulty in cold water and readily soluble in hot water with a blue color which is changed into greenish blue on the addition of ammonia or of a dilute caustic-soda lye and soluble in alcohol with a blue color, being dissolved by concentrated sulfuric acid (of 66° Baumé) with a bluish-violet color which turns greener on the addition of a small quantity of ice, while on adding a larger quantity of ice the color of the solution changes into bluish green and thereupon into green, dyeing unmordanted wool clear greenish-blue and chrome-mordanted wool blue shades, substantially as hereinbefore described.

In testimony whereof we have signed our names in the presence of two subscribing witnesses.

ROBERT E. SCHMIDT.
    PAUL TUST.

Witnesses:
 OTTO KÖNIG,
 J. A. RITTERSHAUS.